United States Patent Office 3,481,884
Patented Dec. 2, 1969

3,481,884
TERBIUM ACTIVATED PHOSPHORS
Frank C. Palilla, Maspeth, and Maija R. Tomkus, Great Neck, N.Y., assignors to General Telephone & Electronics Laboratories Incorporated, a corporation of Delaware
No Drawing. Filed July 17, 1967, Ser. No. 653,669
Int. Cl. C09k 1/36
U.S. Cl. 252—301.4         9 Claims

ABSTRACT OF THE DISCLOSURE

Terbium activated phosphors wherein the host matrix consists of yttrium or lutetium phosphate. These phosphors emit green light when excited by cathode ray, ultraviolet or X-ray radiation and are chemically and thermally stable. Under electron bombardment, their brightness increases linearly with increase in current density over a relatively broad range of current densities.

BACKGROUND OF THE INVENTION

Field of the invention

This invention relates to fluorescent materials which emit green light when exposed to cathode ray, ultraviolet or X-ray radiation and, in particular, to terbium activated phosphors wherein the host matrix consists essentially of yttrium or lutetium phosphate.

Description of the prior art

Green-emitting terbium activated lanthanum phosphate phosphors have been disclosed in U.S. Patent 3,211,666, granted Oct. 12, 1965. These phosphors, which crystallize in the monoclinic system with the monazite structure, exhibit an emission intensity which is of insufficient magnitude for most normal phosphor applications.

The yttrium and lutetium orthovanadates are known to be excellent hosts for many of the elements of the lanthanide series such as europium, samarium and dysprosium. However, when the orthovanadates are activated by terbium the light output obtained is extremely feeble. These orthovanadates crystallize in the tetragonal system with the xenotime structure.

SUMMARY OF THE INVENTION

We have discovered that strong green emission can be obtained from a phosphor consisting essentially of a composition defined by the formula $APO_4$:Tb, where A is selected from the group consisting of yttrium and lutetium. The mole percent of terbium substituted for A is selected to produce fluorescence when the composition is excited by cathode ray, ultraviolet or X-ray radiation. More specifically, 7–20 mole percent of terbium has been found to produce good luminescence.

These phosphors exhibit a linear increase in brightness under cathode ray excitation at current densities in excess of one ampere per square centimeter. This is in comparison to the current standard green-emitting phosphor used in color television cathode ray tubes, silver activated zinc cadmium sulfide, which begins to saturate well below 0.01 ampere per square centimeter; that is, further increases in current density above this value result in smaller increases in brightness per additional unit of current density than are obtained at current densities below saturation. Further, while the brightness of our new phosphors at low current densities is less than that exhibited by the standard material, at higher current densities they are brighter than the standard. In general, these materials are 50% as bright as the sulfide standard below 0.01 ampere per square centimeter, but at current densities above 0.25 ampere per square centimeter they exceed the sulfide in brightness. This is of particular significance in cathode ray tubes of the type which subject the phosphor to higher beam current densities than are normally employed in the conventional shadow-mask color tube.

When compared with terbium activated lanthanum phosphate under 10 kilovolt cathode ray excitation, terbium activated yttrium phosphate exhibits a brightness approximately four times greater than the prior art phosphor. Under the same conditions, terbium actviated lutetium phosphate is almost three times as bright as the lanthanum material. Although the reasons for this difference in brightness are, at best, only partially understood, it is possible that the increase in brightness is related to the fact that $YPO_4$ and $LuPO_4$ crystallize in the tetragonal system with the xenotime structure whereas $LaPO_4$ crystallizes in the monoclinic system with the monazite structure. However, $YVO_4$, which is isostructural with $YPO_4$ and $LuPO_4$, exhibits extremely feeble emission when activated by terbium.

It has been found that cerium may be used to sensitize the ultraviolet excited termium emission in yttrium phosphate. Gadolinium may also be used as a sensitizer but is less effective than cerium. Other known sensitizers such as copper and thallium appear to be ineffectual as sensitizers of this new phosphor.

DESCRIPTION OF THE PREFERRED EMBODIMENTS

Example I 203.26 grams of yttrium oxide, $Y_2O_3$, 36.64 grams of terbium oxide, $Tb_2O_3$, and 283.95 grams diammonium hydrogen phosphate, $(NH_4)_2HPO_4$, were dry blended at room temperature, placed in an uncovered quartz crucible and fired in air at 900° C. for two hours. The material was then removed from the furnace, allowed to cool, ground and blended with 9.26 grams of a lithium phosphate, $Li_3PO_4$, flux. The mixture was then reinserted into the furnace in the quartz crucible and fired again at 1400° C. for two hours. After removal from the furnace, the cooled phosphor was washed with dilute nitric acid and water, all traces of the flux being removed thereby.

This procedure yielded a material having 10 mole percent terbium and particle sizes in the range 5 to 25 microns. Improved crystallinity is obtained by use of the flux system, $Li_3PO_4$ and $Na_4P_2O_7$ being preferred. Exitation under ultraviolet light produced a fluorescence consisting of line groups centered about 546, 586, 490 and 622 nanometers. The C.I.S color coordinates under cathode ray excitation were found to be $x=0.351$, $y=0.588$. The persistence after $\frac{1}{30}$ second varied between 0.7 and 0.3 percent of the initial brightness as the current density of the electron beam was increased. The time to decay to one-tenth of the initial brightness was found to be 5 milliseconds at 27 kilovolts.

The brightness of the light emitted by the phosphor was measured for electron beam densities from less than 0.006 to 1 ampere per square centimeter at 27 kilovolts. Over this entire range the brightness deviated less than 10 percent in linearity with increasing beam current density. In contrast, the silver activated zinc cadmium sulfide standard deviated strongly from linearity over this range and at 1 ampere per square centimeter yielded only 25 percent of the brightness to be expected if it were linear in response. In addition, the measured brightness of this phosphor at 0.006 ampere per square centimeter was 49 percent that of silver activated zinc cadmium sulfide. At about 0.25 ampere per square centimeter the brightnesses were eequal, and at 1 ampere per square centimeter this phosphor gave a brightness value 169 percent that of the sulfide.

Example II

A phosphor was prepared by the method of Example I except that an equivalent weight of lutetium oxide was substituted for the yttrium oxide, i.e. 358.15 grams. The resultant phosphor, lutetium phosphate activated by 10 mole percent terbium, exhibited an emission spectrum identical with that of $YPO_4$:Tb and the same linear characteristics under electron beam excitation.

The relative responses of this $LuPO_4$:Tb and the $YPO_4$:Tb of Example I were measured under 370 nanometer ultraviolet excitation, 55 kilovolt X-ray and 10 kilovolt cathode ray radiation. These responses were compared with those obtained under identical measuring conditions for $LaPO_4$ activated by 10 mole percent terbium. The results were as follows:

RELATIVE RESPONSES

| Phosphor | Excitation | | |
|---|---|---|---|
| | UV, 370 nm. | X-ray, 55 kv. | cr, 10 kv. |
| $LaPO_4$:Tb (prior art) | 100 | 100 | 100 |
| $YPO_4$:Tb | 156 | 156 | 417 |
| $LuPO_4$:Tb | 173 | 150 | 292 |

Example III

Terbium activated yttrium phosphate samples were prepared wherein 7 and 20 mole percent terbium respectively were incorporated. The method used was that of Example I except that, for the 7 mole percent material, 210.03 grams of $Y_2O_3$ and 25.65 grams of $Tb_2O_3$ were employed. For the 20 mole percent phosphor, 180.67 grams of $Y_2O_3$ and 73.28 grams of $Tb_2O_3$ were used. The spectral and linearity characteristics were the same as for the sample of Example I but the brightness was less under ultraviolet, X-ray and cathode ray excitation.

Example IV

Terbium activated, cerium sensitized yttrium phosphate samples were prepared. The method used was that of Example I except that 2.5 percent of cerium was included in addition to the 10 percent terbium; that is 8.61 grams of ceric oxide, $CeO_2$, and 197.61 grams of $Y_2O_3$ were used, the other weights remaining the same as in Example I. Thus prepared, the $YPO_4$:Tb, Ce showed an increase in $Tb^{3+}$ emission intensity of 100–130 percent over material prepared in the same way but without cerium when excited by 370 nanometer ultraviolet radiation. (The excitation at 370 nanometers represents the most effective excitation wavelength for $Tb^{3+}$ emission in the $YPO_4$ host.) However, when excited by 330 nanometer radiation, which results in absorption directly into the cerium, the terbium emission was found to be three times that of an unsensitized preparation excited at the 370 nanometer peak absorption. No enhancement due to cerium sensitization was realized under cathode ray excitation.

Example V

Terbium activated cerium sensitized lutetium phosphate samples were prepared by the method of Example IV except that 348.20 grams $Lu_2O_3$ was substituted for the $Y_2O_3$. The resulting phosphor $LuPO_4$, Tb, Ce had substantially the same characteristics as the $YPO_4$:Tb, Ce of Example IV.

What is claimed is:

1. A phosphor consisting essentially of compositions defined by the formula APO:Tb where A is selected from the group consisting of yttrium and lutetium, the mole percent of terbium substituted for A having a value selected to produce fluorescence when the composition is excited by cathode ray, ultraviolet or X-ray radiation.

2. The phosphor defined by claim 1 wherein between 7 and 20 mole percent of terbium is substituted for A.

3. The phosphor defined by claim 1 wherein A is yttrium and approximately 10 mole percent of terbium is substituted for the yttrium.

4. The phosphor defined by claim 1 wherein A is lutetium and approximately 10 mole percent of terbium is substituted for the lutetium.

5. The phosphor defined by claim 1 wherein A is yttrium and approximately 7 mole percent of terbium is substituted for the yttrium.

6. The phosphor defined by claim 1 wherein A is yttrium and approximately 20 mole percent of terbium is substituted for the yttrium.

7. The phosphor defined by claim 1 wherein a sensitizer selected from the group consisting of cerium and gadolinium is incorporated in the composition.

8. The phosphor defined by claim 7 wherein A is yttrium and the sensitizer is cerium.

9. The phosphor defined by claim 7 wherein A is lutetium and the sensitizer is cerium.

References Cited

UNITED STATES PATENTS

| 3,079,347 | 2/1963 | Garrett et al. | 252—301.4 |
| 3,104,226 | 9/1963 | Struck | 252—301.4 |
| 3,211,666 | 10/1965 | McAllister | 252—301.4 |
| 3,322,681 | 5/1967 | Smith | 252—301.4 |

TOBIAS E. LEVOW, Primary Examiner

ROBERT D. EDMONDS, Assistant Examiner